Figure 1:
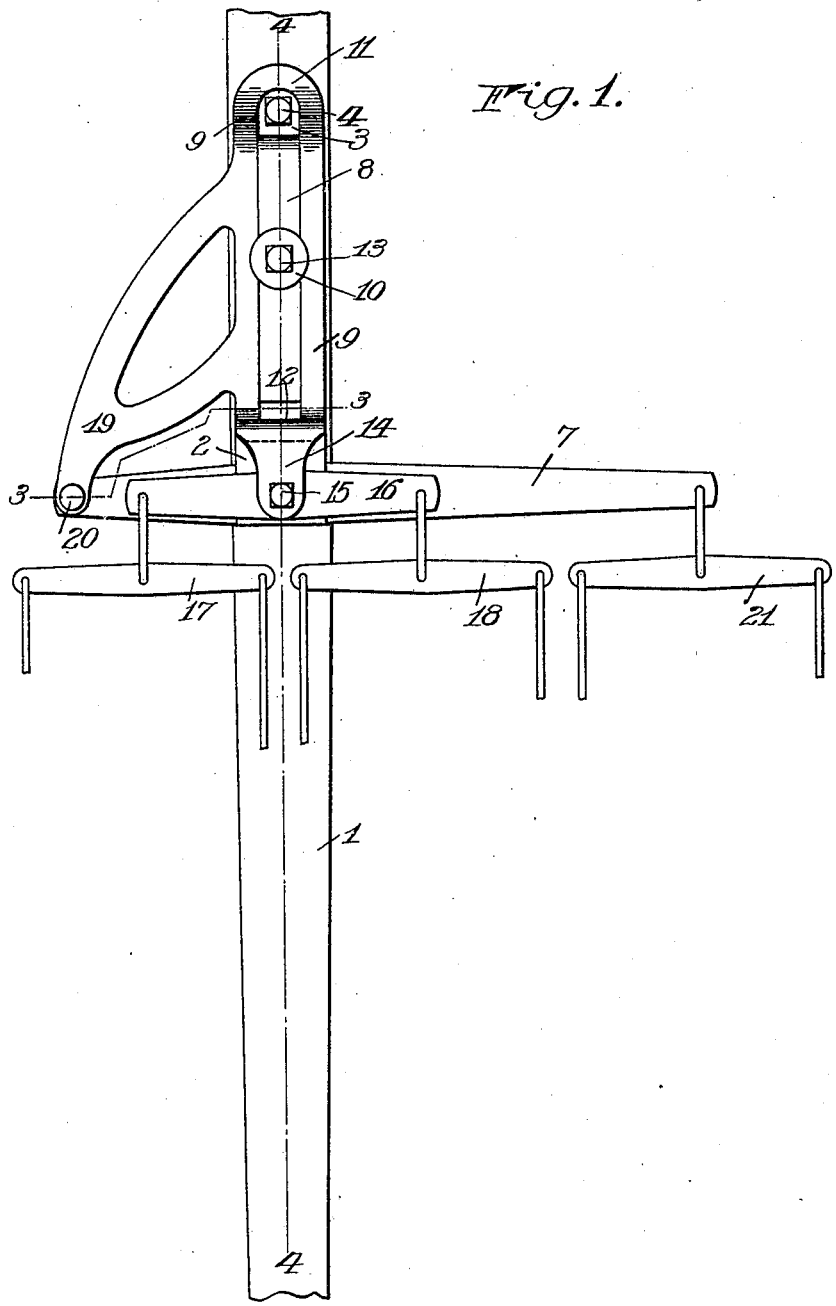

No. 831,020. PATENTED SEPT. 11, 1906.
W. H. TILLOU.
DRAFT EQUALIZER.
APPLICATION FILED AUG. 5, 1905.

2 SHEETS—SHEET 1.

No. 831,020. PATENTED SEPT. 11, 1906.
W. H. TILLOU.
DRAFT EQUALIZER.
APPLICATION FILED AUG. 5, 1905.
2 SHEETS—SHEET 2.
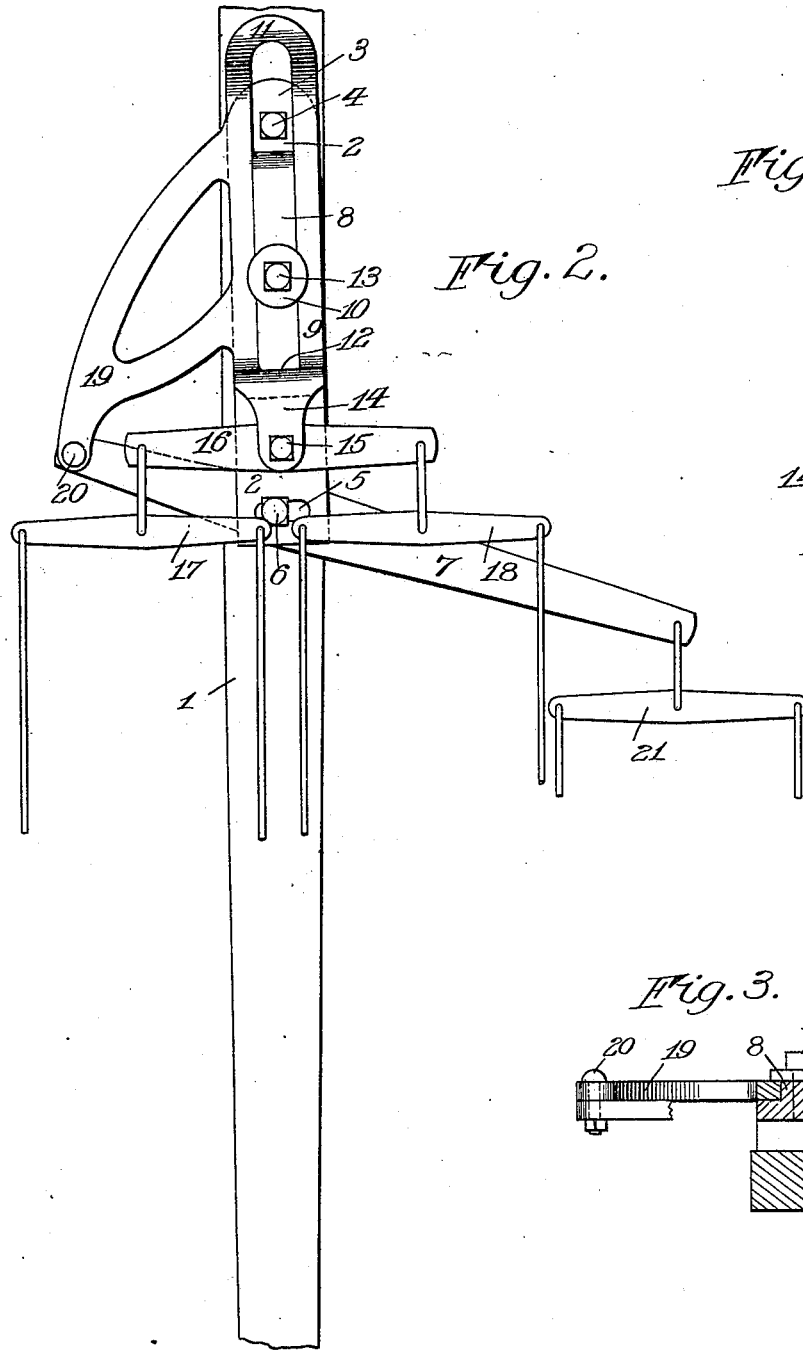
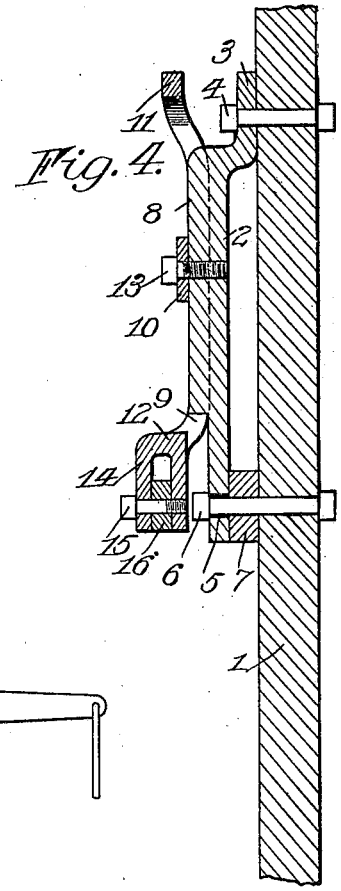
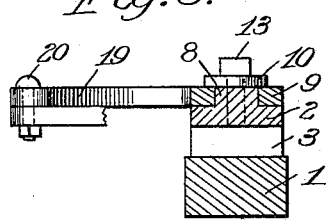
Witnesses
Willard Rich.
Clarence A. Bateman.
Inventor
William H. Tillou
By Frederick Church
his Attorney

UNITED STATES PATENT OFFICE.

WILLIAM H. TILLOU, OF LE ROY, NEW YORK, ASSIGNOR OF ONE-HALF TO GEORGE D. McCOLL, OF LE ROY, NEW YORK.

DRAFT-EQUALIZER.

No. 831,020.  Specification of Letters Patent.  Patented Sept. 11, 1906.

Application filed August 5, 1905. Serial No. 272,836.

*To all whom it may concern:*

Be it known that I, WILLIAM H. TILLOU, of Le Roy, in the county of Genesee and State of New York, have invented certain new and useful Improvements in Draft-Equalizers; and I do hereby declare the following to be a full, clear, and exact description of the same, reference being had to the accompanying drawings, forming a part of the specification, and to the reference-numerals marked thereon.

My present invention relates to improvements in draft-equalizers; and the purpose of my invention is to provide an equalizer or evener adapted for use in connection with wagons, cultivators, binders, and other vehicles or implements which are drawn by a team of three or more horses, whereby the variations in the draft of the several horses will be taken up, so as to impart a uniform pull to the vehicle without causing side draft, the parts being arranged for attachment directly to the ordinary centrally-arranged tongue, so that the latter may be employed in the usual way for guiding and controlling the movement of the vehicle. To these and other ends the invention consists in certain improvements and combinations and arrangements of parts, to be hereinafter more fully described, the novel features being pointed out particularly in the annexed claims.

In the drawings, Figure 1 is a plan view of a draft-equalizer constructed in accordance with my invention, the parts being shown in normal position. Fig. 2 is a view similar to Fig. 1, showing the relative positions assumed by the parts in compensating for the unequal draft of the horses. Fig. 3 represents a cross-section on the line 3 3 of Fig. 1, and Fig. 4 represents a longitudinal section on the line 4 4 of Fig. 1.

The same numerals of reference in the several views designate similar parts.

The present embodiment of my invention illustrates a three-horse draft-equalizer adapted for application directly to the vehicle-tongue 1, the latter being of the usual form and attached, preferably, centrally to the forward portion of the vehicle. On this tongue is mounted a bearing-carrier 2, having at its rear an offset lug 3 to receive a pivot-bolt 4, secured to the tongue, and at the forward portion of the carrier a transversely-arranged slot 5 is provided to receive the main pivot or king-pin 6, the latter extending into the tongue and serving as a pivot for the main equalizing-lever 7. The bearing-carrier is provided with a bearing 8, which is elongated in a direction longitudinally of the tongue and is adapted to receive the slide 9, the latter having guides arranged to slide longitudinally on the bearing 8 and are held in operative position thereon by the washer 10, which also serves as an abutment for the rear stop 11 and the forward stop 12 of the slide to limit the forward and rearward motion of the roof, the said washer being held in place by the bolt 13. The forward and rear stops 11 and 12, respectively, are offset from the guides thereof in order that they may clear the bearing 8 to permit the requisite motion of the slide, but will engage the washer as an abutment.

The forward end of the slide is provided with a bracket 14, the latter having a pivot 15, arranged in line with the bearing 8 and adapted to receive the doubletree 16, to the opposite ends of which are connected the swingletrees 17 and 18, respectively, and as the pivot of the doubletree is centered over the tongue the horses connected to the swingletrees will be arranged at the same distance on either side of the tongue and the draft will be straight ahead.

Projecting from one side of the slide and extending forwardly as far as the bracket 14 thereon is a rigid arm 19, connected by the pivot-pin 20 to the short arm of the main equalizing-lever 7, the long arm of the latter being about twice the length of the short arm thereof and projecting upon the opposite side of the tongue, and at this end of the lever the swingletree 21 for the third horse is connected.

In operating a three-horse equalizer of this kind one horse can be harnessed up in the usual way upon either side of the vehicle-tongue and will draw on the doubletree, while the third horse will be arranged at one side and connected to the long arm of the main equalizing-lever. Consequently the draft from the doubletree will be transmitted, through the pin 15, to the slide and from the latter to the lateral arm 19 thereon, bringing a force operating in a forward direction to bear on the short arm of the main equalizing-lever 7, while, on the other hand, the draft from the third horse operating on the long arm of lever 7 will tend to balance the force acting thereon from the arm 19 of the slide. However, when the draft from the third horse, connected to the long arm of the lever, is above normal or the draft on the doubletrees is below normal the lever 7 will be rocked into the position shown in Fig. 2, the short arm of lever 7 operating on the lateral arm 19 of the slide to move the latter rearward on its bearing, thus allowing the swingletree to move ahead of the doubletree, and, conversely, when the single horse, connected to the long arm of the lever, lags behind, or the draft of the horses attached to the doubletree is above normal, lever 7 will swing in the opposite direction, drawing the slide forward on the tongue and causing the lateral arm 19 thereon to act upon the lever 7, thus permitting the doubletree to advance relatively to the swingletree at the long arm of the lever, and in this way a substantially uniform draft is exerted upon the vehicle notwithstanding variations in the draft of the respective horses.

By mounting the bearing 8 on a carrier which is pivoted to swing in a horizontal plane and in a direction transversely of the vehicle-tongue the necessity of employing slotted bearings in the main equalizing-lever for the pins 6 and 20 is avoided, and in this way excessive wear which would occur on the main lever and the weakness of slotting the parts is avoided and instead the arc in which the pin 20 swings will be compensated for by the swinging motion of the bearing and its carrier in a horizontal plane across the tongue. It is also preferable to offset the stops 11 and 12 of the slide relatively to the bearing 8, for this enables the requisite degree of motion of the slide, while the slide may be comparatively short, as the stops thereon would not engage the bearing, but would coöperate with the washer 10 as an abutment.

A draft-equalizer embodying my invention may be readily applied to the usual tongue of the varous kinds of implements and vehicles, for by the use of the improved construction the parts are short and occupy a short length of the tongue, so that the horses may be hitched closely to the implement or vehicle, and while I have shown and described the invention as applied to a three-horse equalizer it will of course be understood that I do not limit the invention in this respect, for by an obvious arrangement and adjustment of the parts the evener will accommodate any reasonable number of horses.

I claim as my invention—

1. In a draft-equalizer, the combination with a tongue, of a lever pivotally connected to the tongue, a slide arranged to operate longitudinally of the tongue and having a laterally-arranged arm rigid on and movable with said slide and having its laterally-offset portion connected to one end of the lever, and draft appliances attached to the slide and the free end of the lever.

2. In a draft-equalizer, the combination with a tongue, of a main equalizing-lever pivoted at a given point on the tongue, a slide mounted to operate longitudinally of the tongue, an arm rigidly secured to the slide having a portion extending laterally of the tongue and pivotally connected to the main lever at one side of its pivot, and draft appliances attached to the slide and lever.

3. In a draft-equalizer, the combination with a tongue, of a bearing-carrier pivoted thereon to swing in a direction transversely across the tongue and carrying a bearing, an equalizing-lever, a slide mounted to operate on the bearing in a direction longitudinally of the tongue and having a rigid arm extending laterally of the tongue and pivotally connected to the lever, and draft devices for the slide and lever.

4. In a draft-equalizer, the combination with a tongue or support, of an equalizing-lever pivoted on the tongue, a bearing-carrier pivoted to swing transversely of the tongue and having a bearing thereon, and a forward extension having a transversely-arranged slot to receive a pin which serves as a pivot for the lever, a slide mounted to operate on the bearing of the carrier in a direction longitudinally of the tongue and having a portion connected to the equalizing-lever at one side of its pivot, and draft devices carried by the slide and equalizing-lever.

5. In a draft-equalizer, the combination with a tongue or support, of an equalizing-lever pivoted thereon, a bearing on the tongue, a slide mounted to operate on the bearing in a direction longitudinally of the tongue, said slide having stops at its forward and rear portions both offset from the bearing so as to clear it during the operation of the slide, an abutment arranged intermediately of the bearing to coöperate with the stops of the slide, an arm connecting the slide and equalizing-lever, and draft devices for the slide and lever.

6. In a draft-equalizer, the combination with a tongue or support, of a bearing-carrier pivoted at its rear to swing transversely across the tongue and carrying a bearing, a slide mounted to operate on the bearing in a direction longitudinally of the tongue, an equalizing-lever pivoted to turn about a given point on the tongue, an arm rigid on the slide and having a pivotal connection with the lever at one side of its pivot, and draft devices for the slide and lever.

WILLIAM H. TILLOU.

Witnesses:
E. LEO FAY,
SCOTT W. SKINNER.